United States Patent Office 2,923,492
Patented Feb. 2, 1960

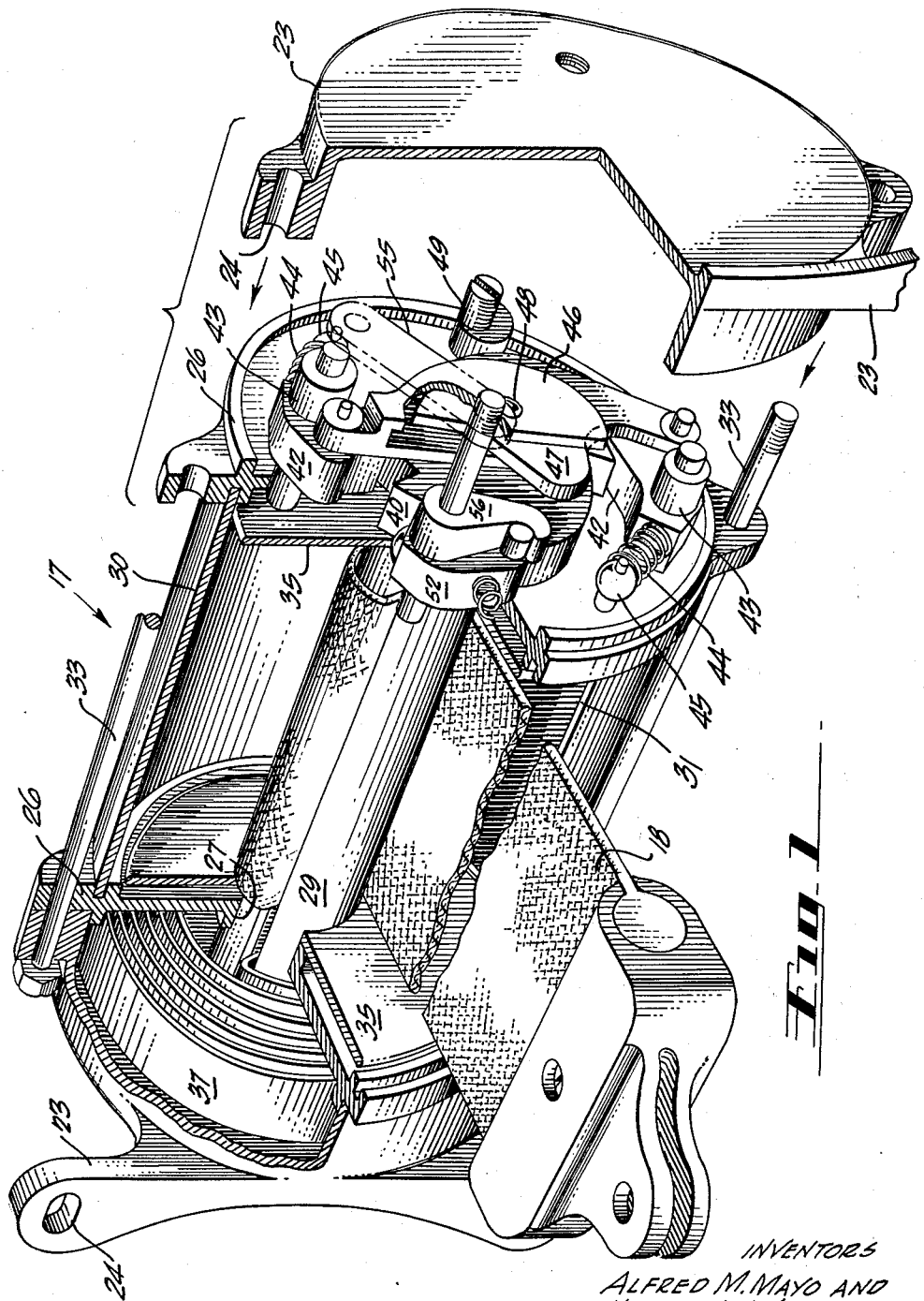

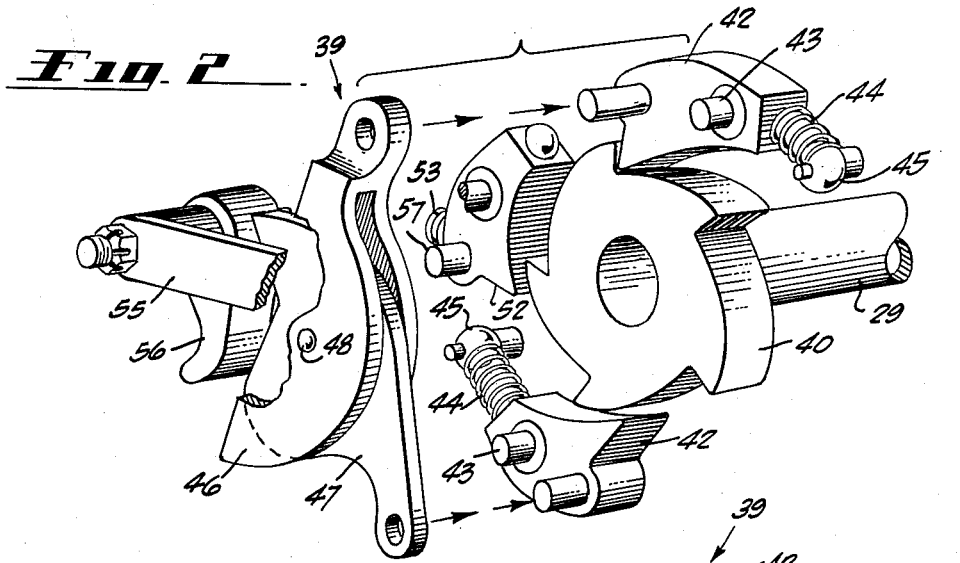
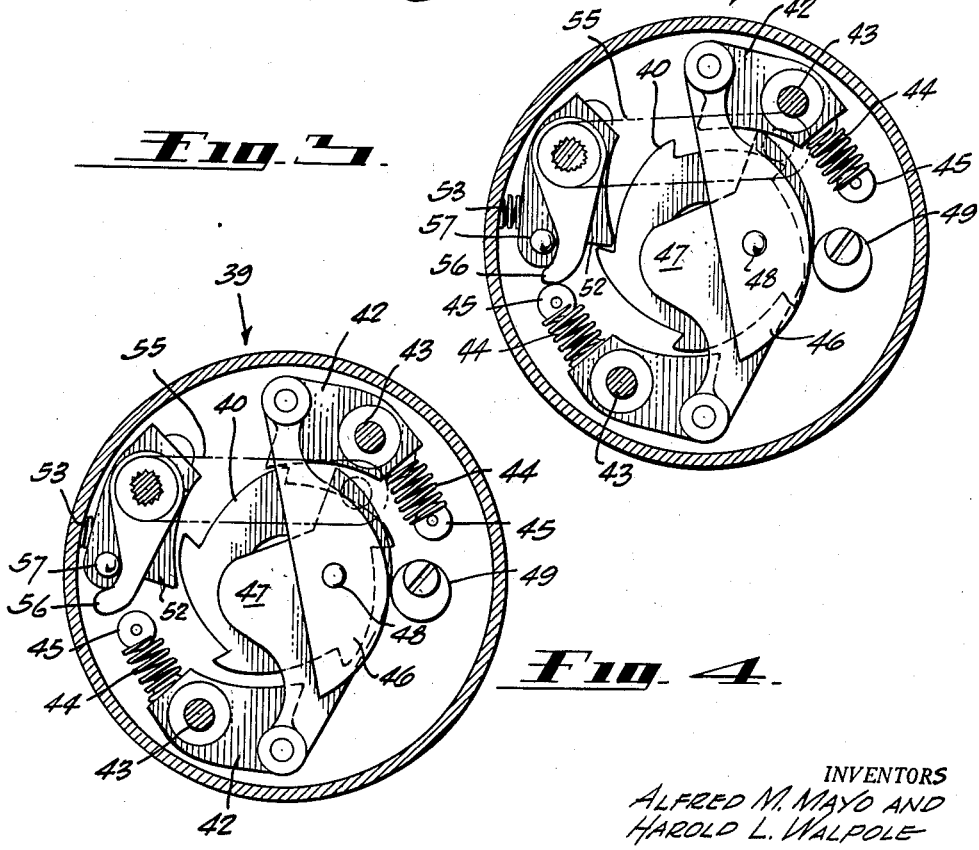

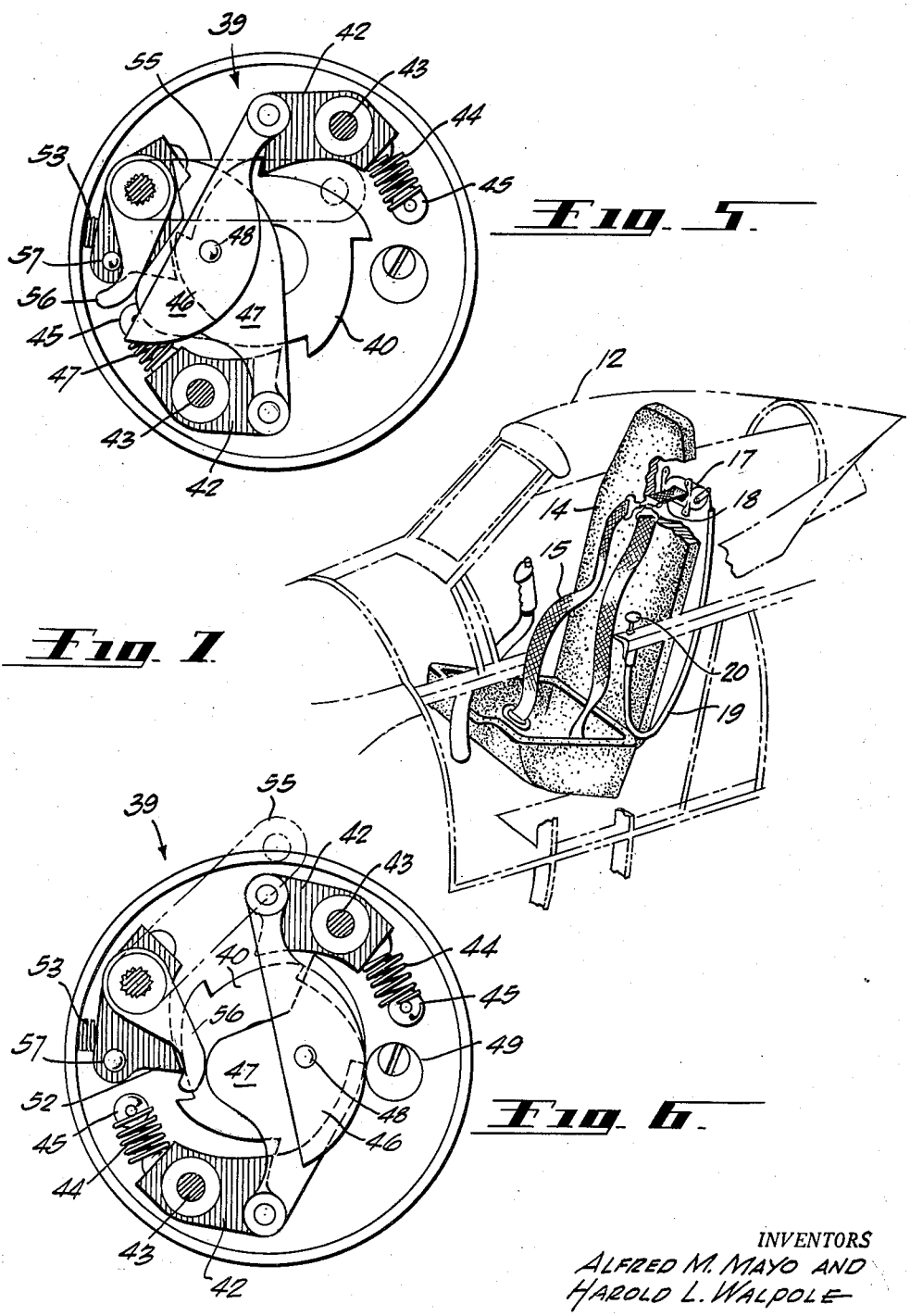

2,923,492
INERTIA REEL

Harold L. Walpole, Torrance, and Alfred M. Mayo, Palos Verdes Estates, Calif., assignors to Douglas Aircraft Company, Inc., Santa Monica, Calif.

Application May 14, 1956, Serial No. 586,345

9 Claims. (Cl. 242—107.4)

This invention relates to automatically locking winding reels especially suitable for use in conjunction with safety body harness of the type employed in vehicles.

The present device represents a departure in structural detail from, but utilizes several principles of operation of, the invention shown and described in our prior U.S. Patent No. 2,708,555 issued May 17, 1955.

In general the invention includes a novel arrangement of inertia operated means for effecting positive arresting of rotation in at least one direction of the winding drum portion of a take-up reel. More particularly in its present form, the inertia operated arresting means includes one or a series of latching pawls adapted to engage a toothed wheel attached to and rotating with the spindle of the winding drum. Interacting with the pawls is a linkage system having two operative positions, in the first of which the pawls are restrained from engagement with the toothed wheel and in the second of which the pawls are urged into latching relation with the wheel. By appropriate orientation and apportionment of mass, the linkage system moves from its first to its second position by its own inertia upon rapid deceleration of the support to which the reel assembly is attached.

By the placement of our locking assembly coaxially adjacent the drum rather than within periphery thereof, as in our previous patent, we have effected a substantial reduction in the overall diameter of the organization.

In summary, the self locking reel includes a rotary spool or drum on which a cable or web is wound, a coil spring normally biasing the drum in its windup direction, a ratchet wheel on the drum shaft, inertia actuated pawls and cocking means therefor, and a further pawl manually operated into and out of drum locking position. The cable or web free end is adapted for attachment to the body harness and under action of the coil spring serves to continually maintain the harness reasonably tight against the vehicle occupant and yet allows substantial freedom of movement to the occupant. Upon crash impact or any other phenomena causing rapid deceleration of the vehicle the inertia latch is operable to prevent further pay out of the wound cable or web for preventing the vehicle operator or occupant from hurtling forward by his own inertia.

A further feature of the invention resides in the arrangement of the cocking cam for the inertia latch and means for operating the manual latch whereby at all times when the reel rotation is not prevented by the manual latch the inertia latch is free to move to locking position.

Other features of novelty and advantages of construction will become apparent from an understanding of the accompanying drawings in which:

Figure 1 is a perspective view of the reel with some portions broken away for clarity.

Figure 2 is an exploded view of ratchet wheel and inertia operated pawl portions of the reel;

Figures 3, 4, 5 and 6 are side sectional views of those reel components of Figure 2 in assembled condition, and depict the several operative positions which the parts attain; and Figure 7 is a perspective view of an aircraft pilot's seat showing the relation therewith of the reel of the present invention and attached body harness.

Now with reference to the drawings, in Figure 7 there is shown, in phantom, a cockpit portion 12 of an airplane in which is located a pilot seat 14 to which is attached the lower end of the body harness 15 for positioning about the shoulders of the pilot. To the back of the seat 14, or other stationary part of the vehicle body, is affixed a take-up reel 17. By an internal mechanism hereinafter described, a short length of nylon webbing 18 or other flexible tension bearing member such as a cable is normally retracted by resilient means into the reel 17. The free end of webbing 18 connects to the upper end of body harness 15 and under the urge of the resilient retracting force the harness 15 will be maintained snugly against the pilot's body. The strength of the resilient means is readily overcome and, when the reel 17 is in unlocked condition, normal body motion will withdraw webbing 18.

Leading away from and connected to the reel 17 is a Bowden cable 19 having an operating knob 20 at its remote end conveniently positioned for manipulation by the pilot.

Turning now to the details of the reel 17 in Figure 1 it is shown that such reel 17 includes composite end plates and mounting brackets 23 at opposite extremities thereof, such brackets 23 being apertured at 24 for the reception of removable screw fasteners by which reel 17 is attached to the seat 14. Intermediate end plates 23 is a pair of dividing disks 26, each being centrally journaled at 27 for the reception of main shaft 29. As a spacer and dust cover a cylindrical sleeve 30 is interposed between dividing disks 26 with its ends seated in circular grooves therein. A slit 31 in spacer 30 allows passage of webbing 18 into the interior of reel 17. The components thus far defined are maintained in assembled condition by a series of transverse tie bolts 33.

The previously mentioned webbing 18 has its inner end affixed to drum or shaft 29 and on rotation of such shaft 29 it will wind on or unwind therefrom, depending on the direction of the rotation, through slit 31. Web edge confining disks 35 are located on shaft 29 at opposite sides of webbing 18 and may be free spinning, as here shown, or affixed to the shaft 29 for rotation therewith. These disks 35 are equivalents of spool flanges and serve to reduce or eliminate friction between webbing 18 and reel 17 in winding and unwinding.

In the chamber defined by end plate 23 and the adjacent bearing disk 26 is situated a torsion spring 37 interacting between the reel casing and shaft 29 to normally wind in the webbing 18.

At the opposite end of the reel 17 is a second chamber formed by the other pair of plates 23 and bearing disks 26 in which is housed the means generally designated by numeral 39 for positively braking rotary motion of shaft 29 in the direction in which web 18 unwinds therefrom. It is in the position and details of construction of this braking means 39 that this invention differs from that disclosed in our above mentioned patent.

As best seen in Figure 2, the end of shaft 29 has immovably attached coaxially thereto, as by splining, a toothed circular member 40 constituting a ratchet wheel. Above and below the axis of rotation of wheel 40 are a pair of pawls 42, each pivoted at 43 to bearing disk 26. Coil spring 44 is interposed between one end of each of pawls 42 and fixed posts 45 and at all times urges the associated pawl 42 into contact with ratchet wheel 40. The pawls 42 are so located that they alternately engage the teeth of wheel 40 and the maximum free rotation of the wheel 40, when the pawls 42 are released by means hereinafter described, is one half the distance between successive teeth. While more or less pawls 42 may be used and their positioning varied in relation to the wheel 40, our arrangement was elected as a result of a compromise of strength requirements and maximum permissible reel travel when stopping thereof is to be accomplished. To each pawl 42 are respectively pin connected levers 46 and 47 which in turn are pivoted to each other at 48, thereby forming a toggle joint. The dimensioning of the levers 46 and 47 and pivot points are such that when the toggle joint is at dead center i.e. the pivot points are aligned, or is slightly on either side of dead center, the pawls 42 will be maintained out of locking engagement with ratchet wheel 40.

The force of coil springs 44 acting through pawls 42 is exerted on the toggle joint to constantly move it or maintain it in one or the other of its over center positions. In the stead of springs 44 a single tension spring (not shown) between the respective points at which levers 46 and 47 are pivoted to pawls 42 could be used with the same effectiveness.

To the right, as viewed in Figure 3, an eccentric 49 is attached to end plate 23. This eccentric 49 is situated to be abutted by the toggle joint in one slightly over center position and prevent pawls 42 from engagement with ratchet wheel 40. In this condition the reel 17 is referred to as being in cocked condition. By turning eccentric 49 a change in degree of off-center of the toggle joint is made for purposes hereinbelow explained.

The mass of the levers 46 and 47 is of an adequate extent that upon a rapid deceleration from a velocity in a direction to the left of the reel as viewed in Figure 3, which is the normal vehicle motion direction, the toggle joint moves under the influence of the mass inertia away from contact with stop 49 across dead center and into the position shown Figure 5. By angularly adjusting the cam stop 49, thus varying the extent of over center of the toggle joint the rate of deceleration at which the inertia is adequate to throw the joint over center in the locking direction is controlled. In moving to this position the pawls 42 engage ratchet wheel 40 to lock it thereby preventing further pay out of webbing 18. In this manner the vehicle occupant is restrained by body harness 15 from being thrown forward under his own inertia.

A third pawl 52 is pivoted to disk 26 and, as are pawls 42, is urged to ratchet wheel engagement by compression spring 53. The spring pressure against pawl 52 is overcome by the action of a manually operable, through Bowden cable 19, lever 55 turning finger 56 which, when moved in one direction, contacts a pin 57 protruding laterally from pawl 52. When finger 56 is turned in the other direction and away from pin 57 its cam face moves against one of the levers 47 of the toggle joint to place the reel in cocked condition, i.e. over center and against stop 49. By utilizing this common means to render pawl 52 inoperative and to cock the reel 17, the pilot cannot inadvertently or intentionally defeat the purpose of the assembly. At all times pawl 52 locks the shaft 29 against rotation or the pawls 42 are in cocked or reel locking position.

Turning briefly to Figures 3 through 6, there is shown therein the inertia and manual operating mechanisms in various positions attainable. In Figure 3, pawl 52 is engaging ratchet 40 and pawls 42 are in cocked position. This setting may be used when a rapid deceleration is anticipated as in arrested carrier deck landings of aircraft. In Figure 4 the reel locking assembly is in normal condition with the inertia operated pawls 42 cocked and pawl 52 out of ratchet engagement. In this position a freedom of pilot motion is permitted but upon crash or other similar occurrence the reel is automatically locked. Figure 5 depicts the reel locking means 39 after actuation effected by deceleration. In Figure 6 there is shown the relative position of parts as the pawls 42 are moved to cocked position by means of the cocking finger or cam 56.

Although only one preferred embodiment of the present invention is shown and possible alterate constructions suggested, it is to be understood that other modifications and variations will be apparent and it is intended that the spirit of the invention include such modifications and variations and be limited only to the extent specified in the appended claims.

We claim:

1. A device of the class described comprising: a rotary drum adapted to have elongate flexible tension bearing means wound thereon; resilient means normally urging the drum to rotate in a direction to wind the tension bearing means thereon; a toothed ratchet wheel coaxially adjacent the drum and being connected thereto to rotate therewith; first and second pawl means respectively disposed above and below a horizontal centerline normal to the axis of rotation of the ratchet wheel and being adapted to engage said wheel to prevent movement thereof in a direction in which the tension bearing means unwinds from the drum; biasing means urging said pawl means into wheel engagement; first and second link means pivoted to each other and respectively pivoted to the first and second pawl means to thereby constitute a toggle joint, the said link means being proportioned to maintain the pawl means out of wheel engagement when the joint is at dead center or slightly on either side of dead center, the biasing means urging said pawl means also urging the toggle joint away from dead center; adjustable stop means adapted to be abutted by said link means when the toggle joint assumes one slightly over center position and thereby maintain the pawl means out of wheel engagement, the inertia of said link means upon rapid deceleration serving to carry the toggle joint from said one over center position to its opposite over center position in which the pawl means engage the ratchet wheel and prevent rotation thereof; third pawl means normally engaging said ratchet wheel; and manually operable means movable in one direction to force the link means into said one over center position and against said stop means, and movable in a second direction to maintain the third pawl means out of engagement with said ratchet wheel.

2. A device of the class described comprising: a rotary drum adapted to have elongate flexible tension bearing means wound thereon; means urging the drum to rotate in a direction to wind the tension bearing means thereon; a toothed ratchet wheel adjacent the drum and rotatable therewith; pawl means engageable with said wheel to prevent movement thereof in a direction in which the tension bearing means unwinds from the drum; biasing means urging said pawl means into wheel engagement; interconnected link means pivoted to the pawl means and constituting a toggle joint, the said link means being proportioned to maintain the pawl means out of wheel engagement when the joint is at dead center or slightly on either side of dead center, the biasing means urging said pawl means also urging the toggle joint away from dead center; stop means adapted to be abutted by said link means when the toggle joint assumes one slightly over center position and thereby maintain the pawl means out of wheel engagement; the inertia of said link means upon deceleration serving to carry the toggle joint from said one over center position to its opposite over center position in which the pawl means engage the ratchet wheel and prevent rotation thereof; third pawl means normally engaging said ratchet wheel; manually operable means movable in one direction to force the link means into said one over center position and against said stop means, and movable in a second direction to maintain the third pawl means out of engagement with said ratchet wheel.

3. A device of the class described comprising: a rotary drum adapted to have elongate flexible tension bearing means wound thereon; resilient means normally urging the drum to rotate in a direction to wind the tension bearing means thereon; a toothed ratchet wheel coaxially adjacent the drum and being connected thereto to rotate therewith; first and second pawl means disposed about the ratchet wheel and being adapted to engage said wheel to prevent movement thereof in a direction in which the tension bearing means unwinds from the drum; biasing means urging said pawl means into wheel engagement; first and second link means pivoted to each other and respectively pivoted to the first and second pawl means to thereby constitute a toggle joint, the said link means being proportioned to maintained the pawl means out of wheel engagement when the joint is at dead center or slightly on either side of dead center, the biasing means urging said pawl means also urging the toggle joint away from dead center; adjustable stop means adapted to be abutted by said link means when the toggle joint assumes one slightly over center position and thereby maintain the pawl means out of wheel engagement, the inertia of said link means upon deceleration serving to carry the toggle joint from said one over center position to its opposite over center position in which the pawl means engage the ratchet wheel and prevent rotation thereof; and manually operable means movable in one direction to force the link means into said one over center position and against said stop means.

4. A device of the class described comprising: a rotary drum adapted to have elongate flexible tension bearing means wound thereon; resilient means normally urging the drum to rotate in a direction to wind the tension bearing means thereon; a toothed ratchet wheel coaxially adjacent the drum and being connected thereto to rotate therewith; first and second pawl means disposed about the ratchet wheel and being adapted to engage said wheel to prevent movement thereof in a direction in which the tension bearing means unwinds from the drum; biasing means urging said pawl means into wheel engagement; first and second link means pivoted to each other and respectively pivoted to the first and second pawl means to thereby constitute a toggle joint, the said link means being proportioned to maintain the pawl means out of wheel engagement when the joint is at dead center or slightly on either side of dead center, the biasing means urging said pawl means also urging the toggle joint away from dead center; stop means adapted to be abutted by said link means when the toggle joint assumes one slightly over center position and thereby maintain the pawls out of wheel engagement, the inertia of the mass of said link means upon deceleration carrying the toggle joint from said one over center position to its opposite over center position in which the pawls engage the ratchet wheel and prevent rotation thereof; third pawl means normally engaging said ratchet wheel; manually operable means movable in one direction to force the link means into said one over center position and against said stop means, and movable in a second direction to maintain the third pawl means out of engagement with said ratchet wheel.

5. A device of the class described comprising: a rotary drum adapted to have elongate flexible tension bearing means wound thereon; resilient means normally urging the drum to rotate in a direction to wind the tension bearing means thereon; a toothed ratchet wheel coaxially adjacent the drum and being connected thereto to rotate therewith; pawl means disposed to move into engagement with the ratchet wheel to prevent movement thereof in a direction in which the tension bearing means unwinds from the drum; biasing means urging said pawl means into wheel engagement; a toggle joint cooperating with and maintaining the pawl means out of wheel engagement when the joint is at dead center or slightly on either side of dead center, the biasing means urging said pawl means also urging the toggle joint away from dead center; and stop means adapted to be abutted by said toggle joint in one slightly over center position and thereby maintain the pawl means out of wheel engagement, the mass of said links serving, upon deceleration thereof, to carry the toggle joint from said one over center position to its opposite over center position in which the pawls engage the ratchet wheel and prevent rotation thereof.

6. A device of the class described comprising: a rotary drum adapted to have elongate flexible tension bearing means wound thereon; resilient means normally urging the drum to rotate in a direction to wind the tension bearing means thereon; a toothed ratchet wheel connected to the drum and rotating therewith; pawl means movable into and out of engagement with the ratchet wheel, and being adapted when in engagement with said wheel to prevent movement thereof in a direction in which the tension bearing means unwinds from the drum; biasing means urging said pawl means into wheel engagement; a toggle joint cooperating with and maintaining the pawl means out of wheel engagement when the joint is at dead center or slightly on either side of dead center, the biasing means urging said pawl means also urging the toggle joint away from dead center; stop means adapted to be abutted by said toggle joint in one slightly over center position and thereby maintain the pawl means out of wheel engagement, the mass of said links, upon deceleration thereof, serving to carry the toggle joint from said one over center position to its opposite over center position in which the pawl means engage the ratchet wheel and prevent rotation thereof; other pawl means normally engaging said ratchet wheel; manually operable means movable in one direction to force the toggle joint into said one over center position and against said stop means, and movable in a second direction to maintain said other pawl means out of engagement with said ratchet wheel.

7. A device of the class described comprising: means adapted to have a flexible tension bearing element wound thereon; braking means; a member connected to the first said means and having a surface thereof interlockingly engageable with the braking means; and a toggle joint connected to the braking means and being movable between two positions, the toggle joint in a first of said positions maintaining the braking means and the member out of engagement and in a second of said positions urging engagement between the braking means and the member, the toggle joint having adequate mass that upon rapid deceleration thereof in a direction between the two positions the inertia of the mass will carry the toggle joint from said first to said second of said positions.

8. A device of the class described comprising: means adapted to have a flexible tension bearing element wound thereon; braking means; a member connected to the first said means and having a surface thereof interlockingly engageable with the braking means; a toggle joint connected to the braking means and being movable between two positions, the toggle joint in a first of said positions maintaining the braking means and the member out of engagement and in a second of said positions urging engagement between the braking means and the member, the toggle joint having adequate mass that upon rapid deceleration thereof in a direction between the two positions the inertia of the mass will carry the toggle joint from said first to said second of said positions, and manually operable means for moving the toggle joint from the second to the first of said positions.

9. A device of the class described comprising: means adapted to have a flexible tension bearing element wound thereon; braking means; a member connected to the first said means and having a surface thereof interlockingly engageable with the braking means; a toggle joint connected to the braking means and being movable between two positions, the toggle joint in a first of said positions maintaining the braking means and the member out of engagement and in a second of said positions urging engagement between the braking means and the member, the toggle joint having adequate mass that upon rapid deceleration thereof in a direction between the two positions the inertia of the mass will carry the toggle joint from said first to said second of said positions, a second braking means engageable with said member; and manually operable means cooperating with the second braking means and the toggle joint to move said toggle joint from the second to the first said positions and simultaneously release the second braking means to engage said member.

References Cited in the file of this patent
UNITED STATES PATENTS
2,708,555     Heinemann et al. _____ May 17, 1955